US 8,522,054 B2

(12) United States Patent
Qin et al.

(10) Patent No.: US 8,522,054 B2
(45) Date of Patent: Aug. 27, 2013

(54) STAND-BY MODE MANAGEMENT METHOD FOR USE IN A STAND-BY MODE OF A COMPUTER SYSTEM WITH STAND-BY MODE MANAGEMENT MODULE

(75) Inventors: Shuang-Shuang Qin, Taipei (TW); Cheng-Wei Huang, Taipei (TW)

(73) Assignee: Via Technologies, Inc., Hsin-Tien, Taipei (TW)

( * ) Notice: Subject to any disclaimer, the term of this patent is extended or adjusted under 35 U.S.C. 154(b) by 626 days.

(21) Appl. No.: 12/619,868

(22) Filed: Nov. 17, 2009

(65) Prior Publication Data
US 2010/0281277 A1    Nov. 4, 2010

(30) Foreign Application Priority Data
Apr. 30, 2009    (CN) .......................... 2009 1 0138609

(51) Int. Cl.
*G06F 1/00*    (2006.01)
(52) U.S. Cl.
USPC ........................................................ 713/300
(58) Field of Classification Search
USPC ........................................................ 713/300
See application file for complete search history.

(56) References Cited

U.S. PATENT DOCUMENTS

| 5,535,752 | A * | 7/1996 | Halperin et al. | 600/483 |
|---|---|---|---|---|
| 7,058,834 | B2 * | 6/2006 | Woods et al. | 713/324 |
| 7,529,872 | B1 * | 5/2009 | Schubert et al. | 710/105 |
| 8,028,177 | B2 * | 9/2011 | Chuang et al. | 713/300 |
| 2004/0225901 | A1 | 11/2004 | Bear et al. | |
| 2004/0225905 | A1 * | 11/2004 | Kawano et al. | 713/320 |
| 2005/0268141 | A1 * | 12/2005 | Alben et al. | 713/500 |
| 2007/0101174 | A1 * | 5/2007 | Tsukimori et al. | 713/300 |
| 2008/0161045 | A1 | 7/2008 | Vuorenmaa | |
| 2008/0192032 | A1 * | 8/2008 | Park et al. | 345/204 |

FOREIGN PATENT DOCUMENTS

| CN | 1550951 A | 12/2004 |
|---|---|---|
| TW | 200601026 | 1/2006 |
| TW | 200611191 | 4/2006 |
| TW | 200719134 | 5/2007 |

OTHER PUBLICATIONS

CN Office Action mailed Apr. 13, 2010.
English abstract of CN1550951A; pub. Dec. 1, 2004.
English language translation of abstract of TW 200601026 (published Jan. 1, 2006).
English language translation of abstract of TW 200611191 (published Apr. 1, 2006).
English language translation of abstract of TW 200719134 (published May 16, 2007).

* cited by examiner

*Primary Examiner* — Mohammed Rehman
(74) *Attorney, Agent, or Firm* — McClure, Qualey & Rodack, LLP

(57) ABSTRACT

A stand-by mode management module applied in a computer system having a BIOS (basic input/output system), a graphic module and a display module is provided. The computer system is operated in a working state and at least one stand-by state. The module includes a timer and an interrupt generation unit. The timer starts a count period when detecting that the computer system is idle. The interrupt generation unit generates an interrupt request to the BIOS to request the computer system to prepare to enter to a specific state when the count period is reached. When the specific state is entered, the computer system enters the stand-by state, a PLL (phase lock loop) of the display module keeps turning on, and PLLs other than the PLL of the display module are turned off and the graphic module acquires a frame stored in a fixed area of a storing unit and displays the acquired frame on the display module.

18 Claims, 3 Drawing Sheets

STAND-BY MODE MANAGEMENT METHOD FOR USE IN A STAND-BY MODE OF A COMPUTER SYSTEM WITH STAND-BY MODE MANAGEMENT MODULE

CROSS-REFERENCE STATEMENT

This application claims priority of China Patent Application No. 200910138609.4, filed on Apr. 30, 2009, the entirety of which is incorporated by reference herein.

BACKGROUND

1. Technical Field

The disclosure relates generally to a stand-by management method and management module and computer system using the same, and, more particularly to a stand-by management method and management module and computer system using the same for an S1 or S3 state in ACPI (Advanced Configuration and Power Interface) states.

2. Background

The ACPI (Advanced Configuration and Power Interface) standard is used in conventional computer systems for power saving. The ACPI standard is also used in portable computers such as notebooks for power management. Five ACPI states, such as S0, S1, S3, S4 and S5 states, are commonly utilized in computer systems. Computer systems can normally operate in the normal state (S0 state) and after the computer system is idle for a predetermined period, the computer system enters one of the stand-by states S1 to S5 that offer power saving, wherein the S3 state offers improved power savings over the S1 state, the S4 state offers improved power savings over the S3 state and so on.

In current computer systems, a BIOS (basic input/output system) can inform an OS (operation system) to enter the stand-by state. Users may choose the S1 or S3 state as the stand-by state of the OS by the BIOS setting. In other words, the BIOS may inform the OS to enter the S1 or S3 state. In the S3 state, most power supplies of devices of a computer system will be turned off in the S3 state while power supplies of all of the devices of a computer system will be turned on in the S1 state. Thus, when considering low power consumption, users may choose the S3 state as the stand-by state of the OS. Although the S3 state uses less power than the S1 state, the time required for resuming to a normal working state is longer than that for the S1 state. A display screen unit (e.g. a LCD) is turned off in the S1 or S3 state.

Conventionally, a computer system will automatically enter a predefined stand-by state after the computer system is idle for a predetermined power saving time period. However, when the computer system is in the stand-by state S1 or S3, the display unit will be turned off and thus more time is needed for the computer system to return to the normal state. Meanwhile, if the user requires viewing the screen while the computer system is in the stand-by state, the user may need to issue a resume command manually such as clicking the mouse and wait for the computer system to resume operation from the stand-by state to the normal state, which is inconvenient for users.

SUMMARY

Stand-by mode management methods and management modules and computer systems using the same are provided.

An embodiment of a stand-by mode management module applied in a computer system has a BIOS, a graphic module and a display module, wherein the computer system is operated in a working state and at least one stand-by state. The module comprises a timer and an interrupt generation unit. The timer starts a count period when detecting that the computer system is idle. The interrupt generation unit generates an interrupt request to the BIOS to request the computer system to prepare to enter to a specific state when the count period is reached, wherein when the specific state is entered, the computer system enters the stand-by state, a PLL (phase lock loop) of the display module keeps turning on, and PLLs other than the PLL of the display module are turned off and the graphic module acquires a frame stored in a fixed area of a storing unit and displays the acquired frame on the display module.

In another embodiment of a stand-by mode management method for use in a computer system having a BIOS (basic input/output system), a graphic module, a display module and a stand-by mode management module, wherein the computer system is operated in a working state and at least one stand-by state. In the working state, whether the computer system is idle is first detected and a count period is started. Before entering a specific state, an interrupt request is generated to request the computer system to prepare to enter to the specific state. When entering to the specific state, the computer system enters the stand-by state, a PLL (phase lock loop) of the display module keeps turning on, and PLLs other than the PLL of the display module are turned off. When in the specific state, a frame stored in a fixed area of a storing unit is acquired and the acquired frame is displayed on the display module by the graphic module.

In another embodiment of a computer system capable of being operated in a working state and at least one stand-by state, comprising a BIOS, a display module, a graphic module and a stand-by mode management module. The BIOS is used for switching a state of the computer system. The display module provides a display. The graphic module is coupled to the display module for controlling the display module. The stand-by mode management module is coupled to the BIOS and the graphic module for performing stand-by mode management, comprising a timer and an interrupt generation unit. The timer starts a count period when detecting that the system is idle. The interrupt generation unit generates an interrupt request to the BIOS to request the computer system to enter to a specific state when the count period is reached, wherein when the specific state is entered, the computer system enters the stand-by state, a PLL (phase lock loop) of the display module keeps turning on, and PLLs other than the PLL of the display module are turned off and wherein when the specific state is entered, the graphic module acquires a frame stored in a fixed area of a storing unit and displays the acquired frame on the display module.

Stand-by mode management methods and management modules and computer systems using the same may take the form of a program code embodied in a tangible media. When the program code is loaded into and executed by a machine, the machine becomes an apparatus for practicing the disclosed method.

BRIEF DESCRIPTION OF THE DRAWINGS

The invention will become more fully understood by referring to the following detailed description with reference to the accompanying drawings, wherein.

DETAILED DESCRIPTION OF DISCLOSED EMBODIMENT

An embodiment is described with reference to FIGS. 1 through 3, which generally relate to stand-by management methods and management modules and computer systems using the same. In the following detailed description, reference is made to the accompanying drawings which from a part hereof, shown by way of illustration of the disclosed embodiments. The embodiments are described in sufficient detail to enable those skilled in the art to practice the invention, and it is to be understood that other embodiments may be utilized and that structural, logical and electrical changes may be made, without departing from the spirit and scope of the invention. The following detailed description is, therefore, not to be taken in a limiting sense. It should be understood that many of the elements described and illustrated throughout the specification are functional in nature and may be embodied in one or more physical entities or may take other forms beyond those described or depicted.

Figure 1:
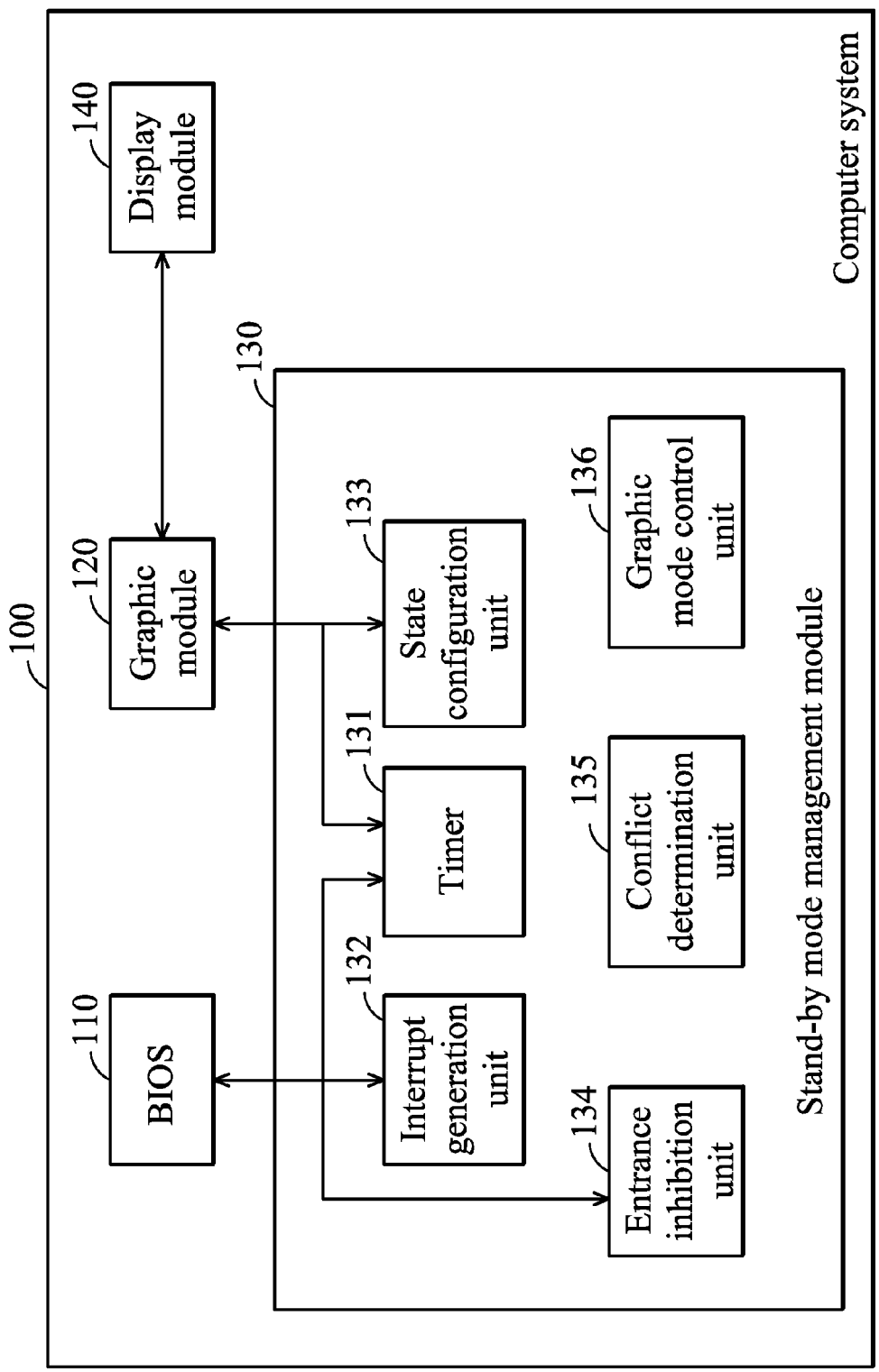
FIG. 1 is a schematic diagram illustrating an embodiment of a computer system of the invention.

FIG. 1 is a schematic diagram illustrating an embodiment of a computer system 100 of the invention. The computer system 100 may be operated in a working state (e.g. S0 state in ACPI standard) and multiple stand-by states (e.g. S1 or S3 state in ACPI standard) in which the computer system 100 is operated in normal state only when it is operated in the working state while other stand-by states are operated in sleeping states. As shown in FIG. 1, the computer system 100 includes a BIOS 110, a graphic module 120, a stand-by mode management module 130 and a display module 140. The BIOS 110 configures a state of the computer system, such as a working state (S0 state) or a stand-by state (S1 or S3 state) according to current system usage and an interrupt request. The graphic module 120 is coupled to the display module 140 for performing graphic related operations and controlling the display module 140 and further displaying the operation result on the display module 140 (e.g. a LCD display). Meanwhile, the graphic module 120 stores current operation frame on the display module 140 in a fixed area (e.g. a buffer) of a storing unit (not shown). In other words, information regarding stored operation frame may be acquired from the fixed area.

The stand-by mode management module 130 is coupled to the BIOS 110 and the graphic module 120 for performing stand-by mode management method of the invention.

The stand-by mode management module 130 includes a timer 131, an interrupt generation unit 132, a state configuration unit 133, an entrance inhibition unit 134, a conflict determination unit 135 and a graphic mode control unit 136. The timer 131 is used for detecting whether the computer system is idle or not. When detecting that the computer system 100 is idle, the timer 131 starts a count period. In one embodiment, the timer 131 is a count-down timer in which the count-down timer has an initial value that is configurable by the BIOS 110. The count-down timer counts from the initial value to 0, continually as long as the computer system is idle. During the counting process, if the timer 131 detects that a wake-up event or operation of the computer system has occurred, the timer will reset to the initial value for recounting. When the count period is reached (i.e. it is counted to 0), or it is time out, it represents that the computer system was idle for a predetermined period. The interrupt generation unit 132 generates an interrupt request to the BIOS 110 for requesting to enter a specific state after the count period for the timer 131 has been reached (e.g. it is counted to 0).

In one embodiment, the specific state corresponds to an S1 state in an ACPI standard, wherein when the computer system 100 is operated in the specific state, the following will occur: (1) the computer system 100 enters the stand-by state (S1 state); (2) the graphic module 120 is in a snapshot mode; (3) a PLL (phase lock loop) of the display module 140 keeps turning on while PLLs other than the PLL of the display module 140 are turned off in the computer system 100; and (4) other peripheral devices in the computer system will enter their corresponding low power consumption power saving modes, i.e. the best power saving mode. When the graphic module 120 is in the snapshot mode, the graphic module 120 will acquire the stored operation frame from the fixed area and continually display the acquired operation frame on the display module 140. That is, the display module 140 will continually display the stored operation frame. In one embodiment, in the specific state, the computer system 100 enters the stand-by state S1 and utilizes the display module 140 to display the last frame stored.

The state configuration unit 133 is coupled to the timer 131 and the graphic module 120 for providing a state configuration value corresponding to the specific state. The state configuration unit 133 asserts a state configuration value after an interrupt request is generated by the interrupt generation unit 132 such that the BIOS 110 may prepare to process the interrupt request for entering the specific state. The BIOS 110 may determine whether to enter the specific state according to the state configuration value in the state configuration unit 133. The state configuration value is a reference value for whether to enter the specific state. For example, the specific state will be entered if the state configuration value equals to a first configuration value (e.g. equals to 1) while the specific state will not be entered if the state configuration value does not equal to the first configuration value (e.g. equals to 0). The graphic module 120 may determine whether to configure itself in the snapshot mode and whether to turn off or enable the PLL of the display module 140 by referring to the state configuration value. If the state configuration value equals to 1, the graphic module 120 will configure itself in the snapshot mode and keep turning on the PLL of the display module 140. In other words, in addition to the PLL of the display module 140 continuously being turned on, PLLs other than the PLL of the display module 140 will be turned off in the specific state. The graphic mode control unit 136 is capable of performing related operations to configure the graphic module 120 to the snapshot mode.

The entrance inhibition unit 134 further has a register for storing an entrance inhibition flag that represents that the specific state is inhibited. For example, if the initial value is configured to be 0, when a predetermined entrance inhibition event occurs, the entrance inhibition unit 134 will initiate the entrance inhibition flag (e.g. configuring the entrance inhibition flag to be 1) to prevent the specific state from being entered. When receiving the interrupt request and before entering the specific state, the BIOS 110 may determine whether to enter the specific state according to the entrance inhibition flag configured in the entrance inhibition unit 134. When the entrance inhibition flag has been configured, which indicates that a predetermined entrance inhibition event has occurred, the BIOS 110 ignores the interrupt request and returns the working state of the computer system (i.e. the state of the computer system is resumed to the S0 state). When the entrance inhibition flag has not been configured, the BIOS 110 directs the computer system 100 to enter to the stand-by state S1 and utilizes the display module 140 to display the last stored frame according to the interrupt request for entering the specific state.

The conflict determination unit 135 is capable of determining whether the wake-up event is a predetermined wake-up event to avoid confliction in the specific state. For example, the predetermined wake-up event may be triggered by a request for switching from a current state to a stand-by state such as a request for switching to the S3 state. The switching request may be generated by an operation such as closing of a notebook computer screen or pressing of a specific computer system 100 button (e.g. a power button or a sleep button), and is not limited thereto. When a predetermined wake-up event occurs, the conflict determination unit 135 delays the predetermined wake-up event for a predetermined time period and issues a false wake-up event to the BIOS 110 and then, after processing of the false wake-up event by the BIOS 110, issues the predetermined wake-up event to the BIOS 110. The false wake-up event may be, for example, an normal wake-up event defined in the standard S1 state such as a key pressing event triggered by pressing any of the keys on the computer system 100. Therefore, the conflict determination unit 135 may issue a false wake-up event, such as a key pressing event triggered by pressing any of the keys on the computer system 100, to the BIOS 110 such that the state of the computer system 100 is resumed from the specific state to the working state S0.

Figure 2:
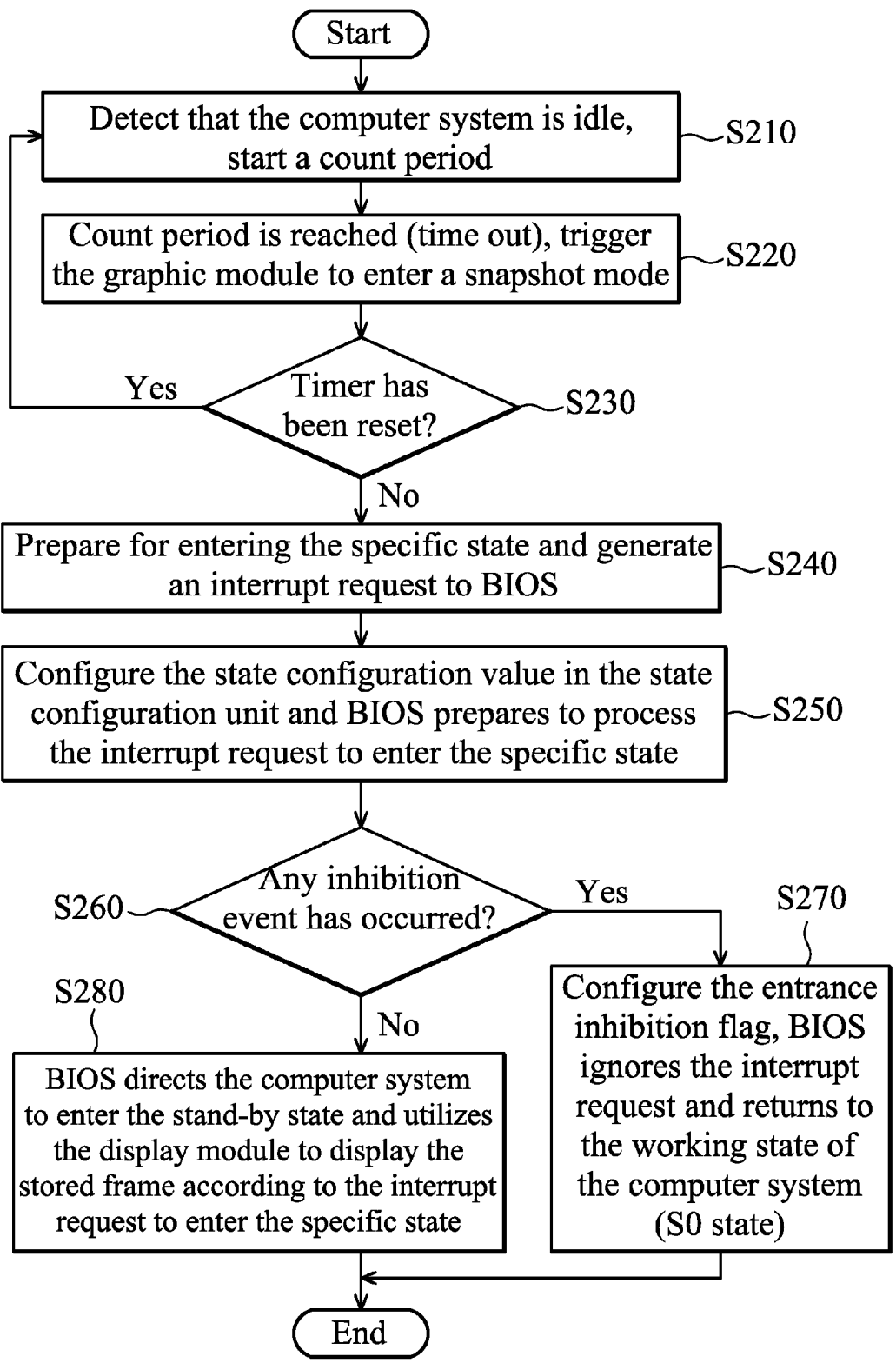
FIG. 2 is a flowchart of an embodiment of a stand-by mode management method of the invention.

FIG. 2 is a flowchart of an embodiment of a stand-by mode management method of the invention. Referring to FIGS. 1 and 2, in this embodiment, it is assumed that the computer system 100 is a notebook computer which is operated in the working state (S0 state) and the timer 131 is a count-down timer in which the count-down timer has an initial value. The specific states of the computer system are as follows: (1) the computer system 100 enters the stand-by state (S1 state); (2) the graphic module 120 is in the snapshot mode; (3) a PLL of the display module 140 keeps turning on while other PLLs in the computer system 100 are turned off; (4) other peripheral devices in the computer system 100 enter their low power consumption power saving modes, i.e. the best power saving mode.

First, in step S210, in the working state, the computer system 100 is not used and therefore is idle such that the stand-by mode management module 130 detects that the computer system 100 is idle and directs the timer 131 to start a count period. When the computer system 100 is continually idle, e.g. the timer counts from the initial value to 0, and when the timer counts to 0, in step S220, the count period is reached (time out), which represents that the computer system 100 is idle for a predetermined period. Thus, the graphic module 120 is triggered and enters a snapshot mode. Meanwhile, PLLs for all devices of the computer system 100 are on and the stand-by mode management module 130 utilizes the graphic mode control unit 136 to configure the graphic module 120 to the snapshot mode. Thereafter, in step S230, it is determined whether the timer has been reset. In one embodiment, the timer is determined to have not been reset if the timer is 0. When the timer has been reset (Yes in step S230), the process goes back to Step S210 to restart another count period. When the timer has not been reset (No in step S230), in step S240, the interrupt generation unit 132 generates an interrupt request to the BIOS 110 to request to enter the specific state.

In Step S250, the stand-by mode management module 130 configures the state configuration value in the state configuration unit 133, e.g. the state configuration value is initiated to be 1 in one embodiment, and the BIOS 110 prepares to process the interrupt request to enter the specific state. Note that the entrance inhibition unit 134 configures an entrance inhibition flag when any predetermined entrance inhibition events occur. In one embodiment, the entrance inhibition flag will be initiated to be 1 to represent entering the specific state is inhibited. When receiving the interrupt request and before entering the specific state, the BIOS 110 will determine whether to enter the specific state according to the entrance inhibition flag configured in the entrance inhibition unit 134. Therefore, in step S260, it is determined whether any inhibition event has occurred. If so, in step S270, the entrance inhibition unit 134 configures the entrance inhibition flag to indicate that a predetermined entrance inhibition event has occurred. Following, the BIOS 110 ignores the interrupt request and returns the working state of the computer system (i.e. the state of the computer system 100 is resumed to the S0 state) and the process ends. Therefore, the computer system 100 is operated in the working state (the S0 state) and all PLLs in the computer system 100 keep turning on.

On the contrary, when no inhibition event occurs (No in step S260), i.e. the entrance inhibition flag has not been configured, in step S280, the BIOS 110 directs the computer system 100 to enter the stand-by state 51 and utilizes the display module 140 to display the stored frame (e.g. the operation frame lastly stored) according to the interrupt request to enter the specific state. Meanwhile, the computer system 100 prevents the PLL of the display module 140 from being turned off and the other PLLs are turned off. Also, other peripheral devices in the computer system enter their low power consumption power saving modes.

In step S280, since the PLL of the display module 140 is still turned on, the graphic module 120 acquires the stored operation frame from the fixed area and continually displays the acquired operation frame on the display module 140 and the computer system 100 enters the stand-by state. In one embodiment, the display module 140 will continually display the stored operation frame thereon.

In general, when wake-up events are triggered, the computer system 100 will enter a deeper sleep state (e.g. the S3 state). However, for the invention, when a predetermined wake-up event occurs, the computer system 100 may treat it as a normal wake-up event and thus wake up, thereby making the user feels confused. Therefore, additional processes are performed for the predetermined wake-up events. For example, the predetermined wake-up event may be triggered by an operation such as closing of a notebook computer screen or pressing of a specific computer system 100 button (e.g. a power button or a sleep button), and is not limited thereto.

Figure 3:
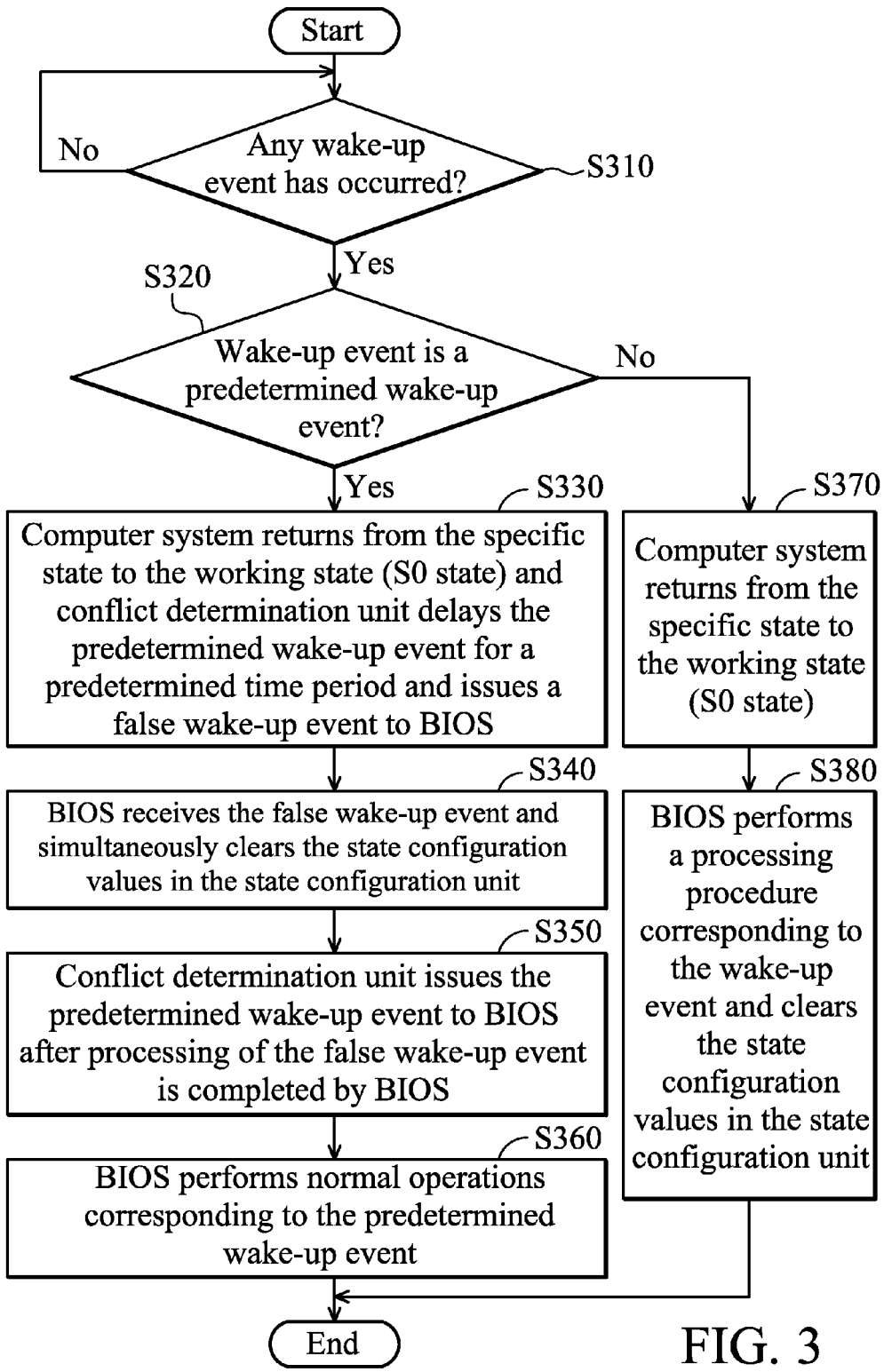
FIG. 3 is a flowchart of an embodiment of a power management method of the invention.

FIG. 3 is a flowchart of an embodiment of a power management method of the invention. It is assumed that the computer system 100 is operated in the specific state. In step S310, it is determined whether any wake-up event has occurred. When no wake-up event occurs, detection in step S310 is continued. When any wake-up event occurs, in step S320, it is determined whether the wake-up event is a predetermined wake-up event. For example, the predetermined wake-up event may be triggered by an operation such as closing of a notebook computer screen or pressing of a specific computer system 100 button (e.g. a power button or a sleep button), and is not limited thereto.

When the detected wake-up event is one of the predetermined wake-up events (e.g. a key pressing event generated by pressing the power button) (Yes in step S320), in step S330, the computer system 100 returns from the specific state to the working state (i.e. S0 state) and the conflict determination unit 135 delays the predetermined wake-up event for a predetermined time period and issues a false wake-up event to the BIOS 110. The false wake-up event may be, for example, an normal wake-up event defined in the standard S1 state such as a key pressing event triggered by pressing any of the keys on the computer system 100. Thus, in step S340, the BIOS 110 receives the false wake-up event, processes the received false wake-up event and simultaneously clears the state configuration values in the state configuration unit 130, such as clearing all state configuration values to zero. After processing of the false wake-up event is completed by the BIOS 110, in step S350, the conflict determination unit 135 issues the predetermined wake-up event to the BIOS 110. Therefore, in step S360, the BIOS 110 receives subsequent predetermined wake-up events and performs normal operations corresponding to the predetermined wake-up event, such as switching the state of the computer system 100 from a current stand-by state to another stand-by state (e.g. the S3 state).

When the wake-up event is not the predetermined wake-up event (No in step S320), in step S370, the computer system 100 returns from the specific state to the working state (S0 state). Then, in step S380, the BIOS performs a processing procedure corresponding to the wake-up event and clears the state configuration values recorded in the state configuration unit 133 for future use.

In summary, according to the stand-by mode management methods and management modules and computer systems using the same, the computer system can be configured to a specific sate when it is idle for a predetermined time period such that hardware circuits therein other than that required for the display unit to display can be turned off or can be configured to enter their corresponding low power consumption power saving modes and the last operation frame can be continually displayed on the display screen. All of the aforementioned processes can be automatically determined by the hardware circuits without interacting with the user, thus not only achieving a power saving purpose but also improving convenience for users.

Systems and method thereof, or certain aspects or portions thereof, may take the form of a program code (i.e., executable instructions) embodied in tangible media, such as floppy diskettes, CD-ROMS, hard drives, or any other machine-readable storage medium, wherein, when the program code is loaded into and executed by a machine, such as a computer, the machine thereby becomes an apparatus for practicing the methods. The methods may also be embodied in the form of a program code transmitted over some transmission medium, such as electrical wiring or cabling, through fiber optics, or via any other form of transmission, wherein, when the program code is received and loaded into and executed by a machine, such as a computer, the machine becomes an apparatus for practicing the disclosed methods. When implemented on a general-purpose processor, the program code combines with the processor to provide a unique apparatus that operates analogously to application specific logic circuits.

While the invention has been described by way of example and in terms of embodiment, it is to be understood that the invention is not limited thereto. Those who are skilled in this technology can still make various alterations and modifications without departing from the scope and spirit of this invention. Therefore, the scope of the disclosure embodiment shall be defined and protected by the following claims and their equivalents.

What is claimed is:

1. A stand-by mode management module applied in a computer system having a BIOS (basic input/output system), a graphic module and a display module, wherein the computer system is operated in a working state and at least one stand-by state, comprising:
a timer, starting a count period when detecting that the computer system is idle; and
an interrupt generation unit, generating an interrupt request to the BIOS to request the computer system to prepare to enter to a specific state when the count period is reached,
wherein when the specific state is entered, the computer system enters a first stand-by state, a PLL (phase lock loop) of the display module keeps turning on, and PLLs other than the PLL of the display module are turned off and the graphic module acquires a frame stored in a fixed area of a storing unit and displays the acquired frame on the display module,
wherein the acquired frame is the last stored frame stored in the storing unit before the computer system enters the first stand-by state, and
wherein the stand-by mode management module further returns the state of the computer system to the working state in response to a predetermined wake-up event in the specific state, and wherein the predetermined wake-up event is triggered by a request for switching from the specific state to a second stand-by state, wherein the second stand-by state is a deeper sleep state compared with the first stand-by state.

2. The stand-by mode management module of claim 1, wherein the timer is a count-down timer having an initial value and the count-down timer is reset to the initial value for recounting when any wake-up event or operation is detected.

3. The stand-by mode management module of claim 1, further comprising a state configuration unit coupled to the timer and the graphic module for providing a state configuration value corresponding to the specific state after the interrupt request is generated by the interrupt generation unit.

4. The stand-by mode management module of claim 3, wherein the graphic module further determines whether the graphic module is configured to a snapshot mode and whether to turn on the PLL of the display module according to the state configuration value provided by the state configuration unit.

5. The stand-by mode management module of claim 1, further comprising an entrance inhibition unit, wherein the entrance inhibition unit configures an entrance inhibition flag to prevent the specific state from being entered when an entrance inhibition event occurs.

6. The stand-by mode management module of claim 5, wherein the BIOS further determines whether to enter to the specific state according to the entrance inhibition flag, and the BIOS ignores the interrupt request and returns the working state of the computer system when the entrance inhibition flag has been configured while the BIOS directs the computer system to enter the first stand-by state and utilizes the display module to display the stored frame according to the interrupt request when the entrance inhibition flag has not been configured.

7. The stand-by mode management module of claim 1, wherein the stand-by mode management module further returns the state of the computer system to the working state in response to a wake-up event in the specific state.

8. The stand-by mode management module of claim 7, wherein the stand-by mode management module further determines whether the wake-up event is the predetermined wake-up event, and if not, returns the state of the computer system from the specific state to the working state and transmits the wake-up event to the BIOS such that the BIOS clears a state configuration value and performs a processing procedure corresponding to the wake-up event.

9. The stand-by mode management module of claim 8, wherein when the wake-up event is the predetermined wake-up event, the stand-by mode management module further returns the state of the computer system from the specific state to the working state, delays the predetermined wake-up event and generates a false wake-up event to the BIOS such that the BIOS clears a state configuration value according to the false wake-up event and issues the delayed predetermined wake-up event to the BIOS thereby directing the BIOS to perform the processing procedure corresponding to the predetermined wake-up event.

10. The stand-by mode management module of claim 9, further comprising a conflict determination unit, wherein when the wake-up event is the predetermined wake-up event, the conflict determination unit delays the predetermined wake-up event for a predetermined time period, issues the false wake-up event to the BIOS and further issues the predetermined wake-up event to the BIOS after processing of the false wake-up event has been done by the BIOS.

11. A stand-by mode management method for use in a computer system having a BIOS (basic input/output system), a graphic module, a display module and a stand-by mode management module, wherein the computer system is operated in a working state and at least one stand-by state, comprising:
in the working state, detecting that the computer system is idle and starting a count period;
before entering a specific state, generating an interrupt request to request the computer system to prepare to enter to the specific state; and
when entering to the specific state, the computer system enters a first stand-by state, a PLL (phase lock loop) of the display module keeps turning on, other PLLs are turned off,
wherein when in the specific state, a frame stored in a fixed area of a storing unit is acquired and the acquired frame on the display module by the graphic module is displayed,
wherein the acquired frame is the last stored frame stored in the storing unit before the computer system enters the first stand-by state, and
wherein the stand-by mode management module further returns the state of the computer system to the working state in response to a predetermined wake-up event in the specific state, and wherein the predetermined wake-up event is triggered by a request for switching from the specific state to a second stand-by state, wherein the second stand-by state is a deeper sleep state compared with the first stand-by state.

12. The stand-by mode management method of claim 11, further comprising:
after the count period has been reached, determining whether to enter to the specific state according to a state configuration value in the stand-by mode management module;
determining whether an entrance inhibition event has occurred; and
when the entrance inhibition event has occurred, configuring an entrance inhibition flag to prevent the specific state from being entered.

13. The stand-by mode management method of claim 12, wherein the step of determining whether to enter to the specific state further comprises:
ignoring the interrupt request and resuming the working state of the computer system when the entrance inhibition flag has been configured.

14. The stand-by mode management method of claim 13, wherein the step of determining whether to enter to the specific state further comprises:
directing the computer system to enter to the first stand-by state according to the interrupt request when the entrance inhibition flag has not been configured; and
utilizing the display module to display the stored frame.

15. The stand-by mode management method of claim 14, further comprising:
resuming the state of the computer system to the working state by utilizing a wake-up event in the specific state.

16. The stand-by mode management method of claim 15, further comprising:
determining whether the wake-up event is the predetermined wake-up event;
if the wake-up event is not a predetermined wake-up event, resuming the state of the computer system from the specific state to the working state; and
issuing the wake-up event to the BIOS such that the BIOS clears a state configuration value and performs a processing procedure corresponding to the wake-up event.

17. The stand-by mode management method of claim 16, further comprising:
when the wake-up event is the predetermined wake-up event, resuming the state of the computer system from the specific state to the working state;
delaying the predetermined wake-up event and generating a false wake-up event to the BIOS;
directing the BIOS to clear a state configuration value according to the false wake-up event; and
issuing the delayed wake-up event to the BIOS thereby directing the BIOS to perform the processing procedure corresponding to the predetermined wake-up event.

18. A computer system operated in a working state and at least one stand-by state, comprising:
a BIOS (basic input/output system) for switching a state of the computer system;
a display module, providing a display;
a graphic module coupled to the display module for controlling the display module; and
a stand-by mode management module coupled to the BIOS and the graphic module for performing stand-by mode management, comprising:
a timer, starting a count period when detecting that the computer system is idle; and
an interrupt generation unit, generating an interrupt request to the BIOS to request the computer system to prepare to enter to a specific state when the count period is reached,
wherein when the specific state is entered, the computer system enters a first stand-by state, a PLL (phase lock loop) of the display module keeps turning on, and PLLs other than the PLL of the display module are turned off, and
wherein when the specific state is entered, the graphic module acquires a frame stored in a fixed area of a storing unit and displays the acquired frame on the display module,
wherein the acquired frame is the last stored frame stored in the storing unit before the computer system enters the first stand-by state, and
wherein the stand-by mode management module further returns the state of the computer system to the working state in response to a predetermined wake-up event in the specific state, and wherein the predetermined wake-up event is triggered by a request for switching from the specific state to a second stand-by state, wherein the second stand-by state is a deeper sleep state compared with the first stand-by state.

* * * * *